(12) United States Patent
Watzke et al.

(10) Patent No.: US 11,468,059 B2
(45) Date of Patent: Oct. 11, 2022

(54) POINT IN TIME CONSISTENT MATERIALIZATION FOR OBJECT STORAGE ENVIRONMENTS

(71) Applicant: Teradata US, Inc., Dayton, OH (US)

(72) Inventors: Michael Warren Watzke, Madison, WI (US); Steven B. Cohen, Redondo Beach, CA (US); Donald Raymond Pederson, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 150 days.

(21) Appl. No.: 16/235,098

(22) Filed: Dec. 28, 2018

(65) Prior Publication Data

US 2020/0110748 A1    Apr. 9, 2020

Related U.S. Application Data

(60) Provisional application No. 62/742,350, filed on Oct. 6, 2018.

(51) Int. Cl.
| | |
|---|---|
| *G06F 16/00* | (2019.01) |
| *G06F 16/2453* | (2019.01) |
| *G06F 16/28* | (2019.01) |
| *G06F 16/23* | (2019.01) |

(52) U.S. Cl.
CPC .... *G06F 16/24539* (2019.01); *G06F 16/2393* (2019.01); *G06F 16/284* (2019.01)

(58) Field of Classification Search
CPC ............. G06F 16/24539; G06F 16/284; G06F 16/2393
See application file for complete search history.

(56) References Cited

U.S. PATENT DOCUMENTS

| | | | |
|---|---|---|---|
| 2007/0073657 A1* | 3/2007 | Santosuosso | ..... G06F 16/24539 |
| 2012/0191697 A1* | 7/2012 | Sherman | ............. G06F 16/2452 707/717 |
| 2016/0098462 A1* | 4/2016 | George | ................. G06F 16/248 707/609 |
| 2019/0065545 A1* | 2/2019 | Hazel | .................... G06F 16/211 |
| 2019/0332698 A1* | 10/2019 | Cho | .................... G06F 16/2365 |

* cited by examiner

*Primary Examiner* — Khanh B Pham
(74) *Attorney, Agent, or Firm* — Gates & Cooper LLP

(57) ABSTRACT

A query that is frequently processed to access an object storage is identified. Results from the query returned from the object storage is transformed into a relational database format as a materialized view. When the query is submitted a subsequent time, updated results are managed from the materialized view, other materialized views, and/or the object storage when needed.

19 Claims, 4 Drawing Sheets

POINT IN TIME CONSISTENT MATERIALIZATION FOR OBJECT STORAGE ENVIRONMENTS

RELATED APPLICATIONS

The present application is a non-provisional application of and claims priority to U.S. Provisional Application Ser. No. 62/742,350 filed Oct. 6, 2018, entitled: "Point in Time Consistent Materialization for Object Storage Environments;" the disclosure of which is hereby incorporated by reference in its entirety.

BACKGROUND

In object storage environments it is common to disconnect the compute and interface environment from external storage architectures that house the source data. The interface and computing environments have no control over the underlying data structure of the source data and no control over how the source data is provided back to the interface and computing environments. In fact, in many cases there is no equivalency to a data load processing step. The storage objects can have a wide range of attributes, ingest frequency, compression effectiveness, object byte size, record format, record size, etc. The underlying source data are storage objects having unique identifiers and creation time stamps. Storage objects are either immutable or have a very low modification rate. It is generally not possible to support applications with stringent Service Level Agreements (SLAs), without some form of "materialization."

A "Materialized View" (MV) is a database object that includes results for a given query. For example, it a MV may be a local copy of data located remotely, entail data type and model transformations from and to the remote environment, contain a subset of rows and/or columns, or may be a summary using aggregate functions.

Generally, any MV provided in the industry requires collaborative distributed systems and materialization is based on the source storage environment with two phase processing. Such industry-available MVs are therefore complex, difficult to support, and provided limited in functionality.

SUMMARY

In various embodiments, methods and a system for point in time materialization for object storage environments are provided.

In one embodiment, a method for a point-in-time materialization of an object storage environment is provided. Storage object values provided from an object storage as results to a query are transformed into a relational database format within a materialized view. Storage object identifiers and timestamps as provided with storage objects from the object storage are maintained within the materialized view. The materialized view is provided to satisfy the query when submitted a second time without accessing the object storage.

DETAILED DESCRIPTION

Figure 1:
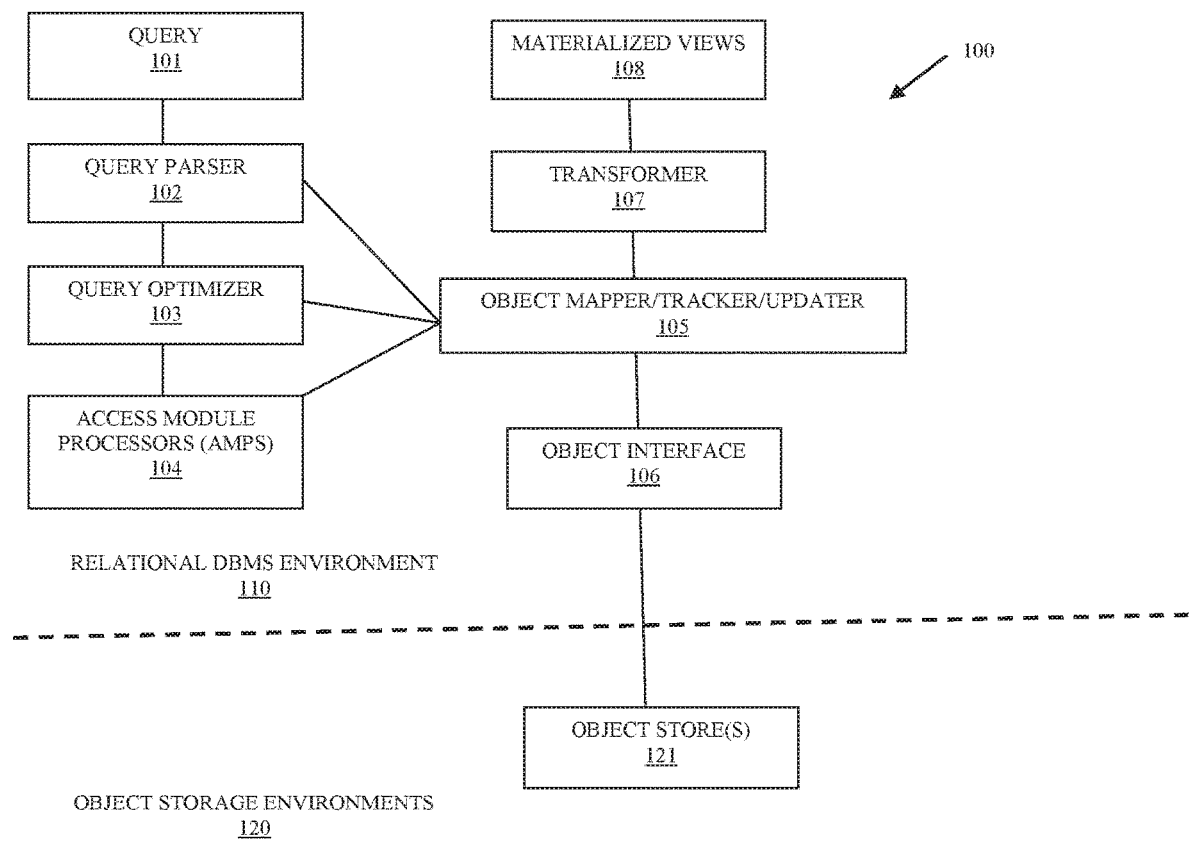
FIG. 1 is a diagram of a system for point-in-time materialization of an object storage environment, according to an embodiment.

FIG. 1 is a diagram of a system 100 for a point-in-time materialization of an object storage environment, according to an embodiment. The system 100 is shown in greatly simplified form with just those components necessary for understanding the teachings of point-in-time materialization of object storage environments being illustrated. It is to be noted that a variety of other components or less components can be employed without departing for the teachings of point-in-time materializations of object storage environments presented herein and below.

The system 100 includes: a query 101, a query parser 102, a query optimizer 103, one or more Access Module Processors (AMPS) 104, an object mapper/tracker/updater 105, an object storage interface 106, a transformer 107, materialized views 108, and one or more object stores 121.

The processing/computing environment is comprised in a relational Database Management System (DBMS) environment 110, which is completely separate and independent of object storage environments 120 that comprise the source (master version) of storage objects housed in the object stores 121.

The components 102-107 are implemented as executable instructions that reside in a non-transitory computer-readable storage medium and are executed by one or more hardware processors of a DBMS within the DBMS computing environment 110. It is to be noted that each component may comprise multiple sub-components logically cooperating to form and perform the processing of the noted component.

As used herein, the terms and phrases "database," "database management system (DBMS)," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse"). The DBMS includes a variety of database tools and operations to manage and provide database services.

In an embodiment, the object storage environment 120 is an S3 storage environment having a plurality of S3 object stores that house S3 objects as master data being maintained for an enterprise/customer/user.

As will be more completely discussed herein and below, the system 100 permits the tracking, projection frequency, and relationship between external object identifiers associated with storage objects housed on the object store 121. The locality to a reference (within a MV 108 local to the DBMS environment 110 versus within the object store 121) is detected for any given query 101 and access to the reference provided from the MV 108. The storage objects from the object store 121 are transformed into a relational format allowing for relational operations and processing to define other MVs 108. The object store's storage object identifiers and timestamps are maintained as column attributes for the MVs 108.

Furthermore Multiversion Concurrency Control (MVCC) is provided when MVs 108 can satisfy any given query 101; the object store 121 only needs accessed when an object identifier's timestamp within the MV 108 is earlier in time than a modification timestamp for the storage object in the object store 121; results for the query is a union of the up-to-date objects from the MVs 108 and any out-of-date objects from the object store 121.

Storage objects can be updated periodically based on object identifiers' timestamps defined with the MVs by searching for more recent time stamps present in the object store 121 and removing MV object values that do not match an MV 108 definition. Storage objects can also automatically be updated based on a workload and a volume of objects for a given MV 108 that are stale, by initiating an automatic refresh on the MV 108. Updating entails modification to a MV 108 that modifies object values by deleting old values and inserting newly acquired values acquired from the object store 121 or updating entails inserting new objects into a MV 108 by inserting new object identifiers and new object values for such identifiers into the MV 108.

As stated before, the master storage objects and their values are controlled and maintained in the object storage environments 120 within the master object stores 121. The system 100 provides techniques for leveraging a DBMS 110 to provide database query processing against storage objects and their values from MVs 108.

The system 100 is provided for applications in which queries 101 and the results associated with those queries 101 are frequently accessed and needed by a customer. As stated before, the storage object that houses the data values is either immutable or changed infrequently, which makes the various techniques discussed herein and below particularly useful to the customer because the customer can realize the benefits (responsiveness and functionality) of a DBMS while their master data is maintained in the object storage environments 120 in object stores 121 as storage objects.

Initially, and in an embodiment, a query 101 may be in a non-relational format and received as a query being submitted to the object store 121, such a query would include one or more storage object identifiers and a text representing filters that are to be processed to return storage object values from the object store 121 that satisfy conditions of the filters. Such, a query 101 may be hashed to a query identifier for purposes of recognizing when the query 101 is submitted a second time. The query 106 is submitted by the object interface 106 to the object stores 121. The storage object identifiers, storage objects' values, and storage objects' modified dates are returned to the object interface 106 and passed to the object mapper/tracker/updater 105. The object mapper/tracker/updater 105 provides to the transformer 107 for transforming components of the data values into tabular and relational database format housed as a virtually maintained table in a MV 108. The MV 108 includes as column attributes the storage object identifier and its modified date as returned by the object store.

In an embodiment, when a query 101 is first identified by the customer as a query 101 that the customer would like to have process frequently against the object store 121, or when the DBMS through statistics identifies such a query 101 that is being regularly processed. The query 101 is parsed by the parser 102 into the appropriate storage object identifiers and search filter. The optimizer 103 then produces an execution plan for the query 101, and the AMPs execute the plan to obtain results. The object mapper/tracker/updater 105 uses the storage object identifiers and execution plan (filter) and provides to the object interface 106. The object interface 106 submits the filter to the object store 121 and storage object identifiers, storage object timestamps, and storage object data values are returned to satisfy the original query 101. The storage object identifiers, storage object timestamps, and storage object data values are provided back to the object mapper/tracker/updater 105, which provides to the transformer 107. The transformer 107 puts the storage object data values into relational database format associated with tables, columns, and rows. This information is provided back to the object mapper/tracker/updater 105, which maintains such transformative information for the parser 102, the optimizer 103, and the AMPs 104 the next or subsequent times the query 101 is encountered. The transformer 107 generates a MV 108, which may be viewed as virtual table within the DBMS 110. The table now has the results of the query 101, with a table identifier (reference) or MV identifier (reference). The object mapper/tracker/updater 105 may store the mapping between the table/MV identifier and the storage object identifiers associated with the storage object values stored in the MV 108 in database statistics or other separately maintained mapping tables. This information can be used by the optimizer 103 and the AMPs 104 should results of a different query 101 include storage object values for storage object identifiers in different MVs 108 from the original query 101.

In an embodiment, the transformer 107 upon identify a query 101 submitted more than a threshold amount (indicating that the query 101 is frequently processed) executes a Structured Query Language (SQL) SELECT Data Manipulation Language (DML) statement to define a mapping that maps the object data values from the storage objects returned as results to a DBMS table format (columns and rows). In this way, the initial MV 108 is automatically created for frequently processed queries.

Once a sufficient number of queries 101 have been initially processed, a variety of MVs 108 may be accessible to the optimizer 103 and the AMPs 104 for providing results to other queries 101. As stated before MVs 108 include column attributes that maintain the storage object identifiers and a timestamp representing the timestamp provided from the object store as a last modification date recorded in the object store 121 for the corresponding storage object (identified by its storage object identifier).

Some MV 108 may be results for queries 101 that were processed against storage objects obtained from other different MV 108, as more storage objects are populated from the object store 121 into the MVs 108. Furthermore, queries 101 can reference and use MVs 108.

As a result, when subsequent queries 101 or a same initial query 101 is encountered after a sufficient population of storage objects from the object stores 121, the query optimizer 103 can devise an execution plan that can satisfy a given subsequent query from a plurality of the MVs 108 to create a new MV 108. The AMPs 104 can use the object mapper/tracker/updater 105 to obtain or report back to the optimizer 103 as to which MV 108 has the most-up-to-date timestamp reflecting a time closet to the submitted time of the given query 101. This allows the optimizer 103 to devise the execution plan steps to satisfy the query 103 by instructing specific AMPs 104 to obtain specific storage objects and their data values from specific MVs 108 controlled or accessible to those AMPs 108 to then assemble a new MV 108 that satisfies the given query 101. During this processing it may become apparent that one MV 108 has an out-of-date storage object, this can be corrected with the execution plan to update that storage object from the MV 108 having the up-to-date storage object or this situation may be left alone since the query 101 associated with that out-of-date storage object will identify this situation and remedy it the next time that query 101 is submitted for execution.

In an embodiment, a filter placed on a particular storage object identifier within the MV 108 may cause the object interface 106 to submit the filter and update the object values in the MV and the time stamp from results of the filter returned by the object stores 121.

Separately, the object interface 106 in cooperation with the object mapper/tracker/updater 105 may be configured to periodically obtain the timestamps (modify date and timestamps) for each of the storage object identifiers associated with storage object values that are maintained in the MVs 108 of the DBMS 110. Each MV 108 is defined by the storage object identifiers housed in the data for that MV 108 and each storage object identifier includes a timestamp, such that when a more up-to-date timestamp is encountered, the new timestamp and its corresponding data values can be obtained, transformed to the corresponding DBMS tabular format by the transformer 107 and updated to the MV 108. Moreover, each MV 108 is associated with a filter (query conditions for the query 101 that it represents), such that the object interface 106 can submit the filter against the object store 121 and discover when storage identifiers should be removed entirely from a MV 108 or when an entirely new storage object identifier, its data values, and its timestamp should be added to a MV 108.

The optimizer 103 in cooperation with the AMPs 104 may also discover that a query 101 associated with a given MV 108 is requiring a number of updates to its storage object identifiers and associated data values. The number can be a predefined threshold number. Such, that the object mapper/tracker/updater 105 can be instructed to run the query 101 filter through the object interface 106 and refresh the MV 108 associated with the query 101. In the process of doing this, the optimizer 103 through cooperation with the AMPs 104 may discover that a number of separate MVs 108 having storage identifiers updated by the object mapper/tracker/updater 105 require updating. This can be done at this time or can be done, separately the next time the queries 101 associated with those MVs 108 are processed by the optimizer 103 and the AMPs 104.

In an embodiment, the query 101 can be satisfied as a union of object values associated with storage object identifiers of the MV 108 from different MVs 108, the object stores 121, and existing object values already present in the MV 108. All of the differently acquired object values can be updated (storage object identifiers, timestamps, and object values) within the MV 108, such that the next time the query 101 is encountered the MV 108 will be up-to-date with the proper object values.

The system 100 through the MVs 108 provides a mechanism by which the DBMS environment may be used as a cache for the object store 121. However, unlike a simple cache, the DBMS adds relational functionality to the underlying data values associated with the storage objects, since the storage objects and their values are transformed into relational tables, columns, and rows within the MVs 108. This also allows the DBMS to manage the MVs 108 as it would other tables within the database and retain statistics for the MVs 108. Furthermore, a portion of one MV 108 can be used to satisfy a portion of a newly-submitted query 101 while portion of a second MV 108 can be used to satisfy a second portion of the newly-submitted query 101. A single storage object and its values can also be updated to one MV 108 from a different MV 108. The process of updating storage objects can be periodic or driven automatically as discussed above.

In an embodiment, the processing discussed above and associated with the object interface 106, the object mapper/tracker/updater 105, and the transformer 107 are all subsumed and included in one or more of the optimizer 103 and the AMPs 104.

These and other embodiments are now discussed with reference to the FIGS. 2-4.

Figure 2:
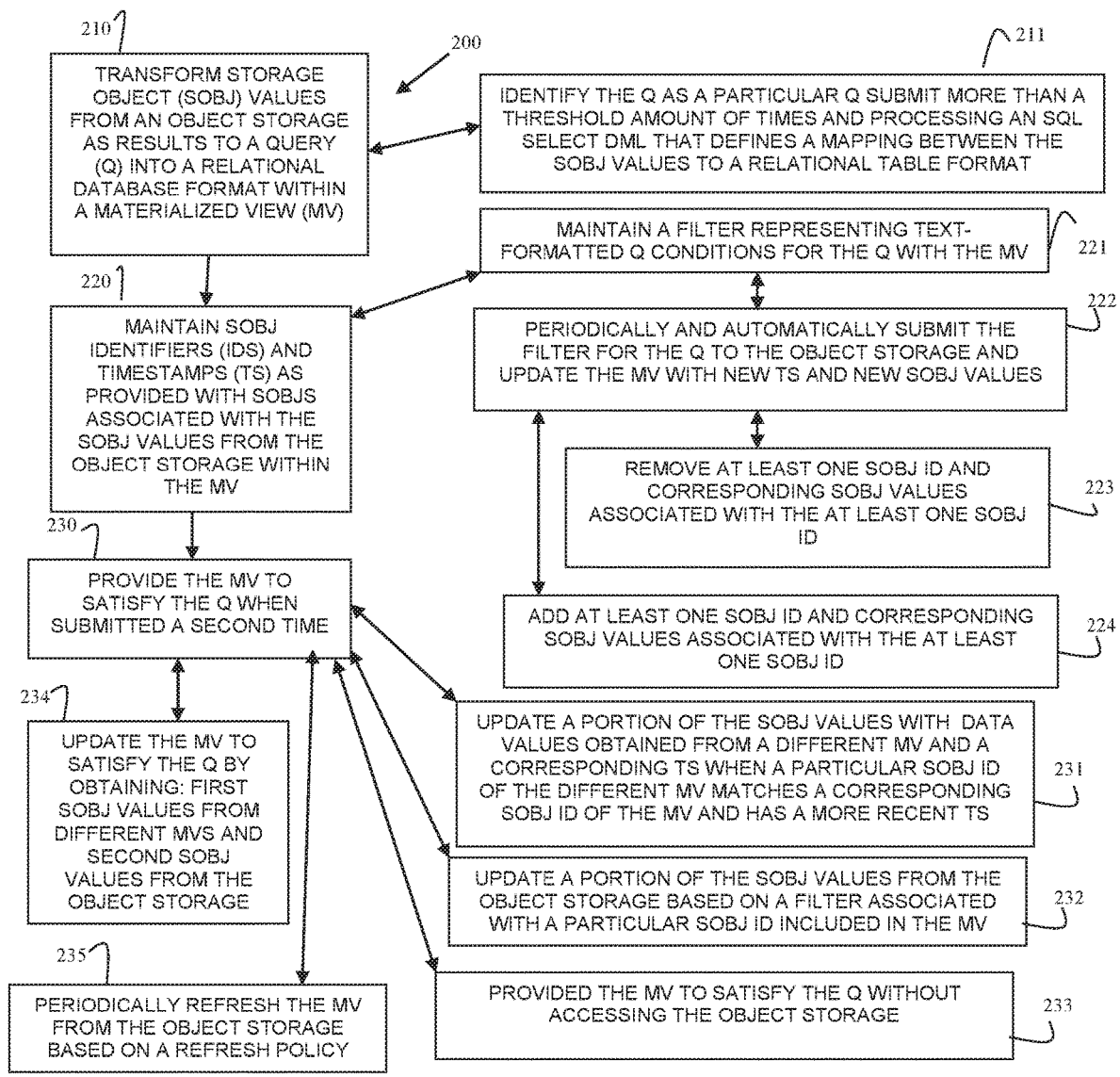
FIG. 2 is a diagram of a method for a point-in-time materialization of an object storage environment, according to an example embodiment.

FIG. 2 is a diagram of a method 200 for a point-in-time materialization of an object storage environment, according to an example embodiment. The method 200 is implemented as one or more software modules referred to as a "materialized view manager"). The materialized view manager represents executable instructions that are programmed within memory or a non-transitory computer-readable medium and executed by one or more hardware processors of one or more devices. The materialized view manager may have access to one or more network connections during processing, which can be wired, wireless, or a combination of wired and wireless.

In an embodiment, the materialized view manager executes on devices of a data warehouse across one or more physical devices or nodes (computing devices) for execution over one or more network connections.

In an embodiment, the materialized view manager is all or of or any combination of: one or more of: the parser 102, the optimizer 103, the AMPs 104, object mapper/tracker/updater 105, the object interface 106, and/or the transformer 107.

At 210, the materialized view manager transforms storage object values from an object storage as results to a query into a relational database format within a materialized view.

In an embodiment, at 211, the materialized view manager identifies the query as a particular query submitted more than a threshold amount of times and processes an SQL SELECT DML statement that defines a mapping between storage object values to a relational table format.

At 220, the materialized view manager maintains storage object identifiers and timestamps as provided with storage objects associated with storage object values from the object storage within the materialized view.

In an embodiment, at 221, the materialized view manager maintains a filter representing text-formatted query conditions for the query within the materialized view.

In an embodiment of 221 and at 222, the materialized view manager periodically and automatically submits the filter for the query to the object storage and updates the materialized view with timestamps and new storage object values.

In an embodiment of 222 and at 223, the materialized view manager removes at least one storage object identifier and corresponding storage object values associated with the one storage object identifier. Here, the original materialized view is being updated to remove a storage object identifier and its corresponding storage object values from the materialized view.

In an embodiment of 222 and at 224, the materialized view manager adds at least one storage object identifier and corresponding storage object values associated with the one storage object identifier. Here, the original materialized view is being updated to add a new storage object identifier and its corresponding storage object values into the materialized view.

At 230, the materialized view manager provides the materialized view to satisfy results for the query when the query is submitted a second time or a subsequent time after the processing at 210.

In an embodiment, at 231 the materialized view manager updates a portion of the storage object values with data values obtained from a different materialized view and corresponding time stamp when a particular storage object identifier of the different materialized view match a corresponding storage object identifier of the materialized view and has a more recent time stamp.

In an embodiment, at 232, the materialized view manager updates a portion of the storage object values from the object storage based on a filter associated with a particular storage object identifier included in the materialized view.

In an embodiment, at 233, the materialized view manager provides the materialized view to satisfy the query without accessing the object storage.

In an embodiment, at 234, the materialized view manager updates the materialized view to satisfy the query by obtaining first storage object values from different materialized views and obtaining second storage object values from the object storage.

In an embodiment, at 235, the materialized view manager periodically refreshes the materialized view from the object storage based on a refresh policy associated with the materialized view.

Figure 3:
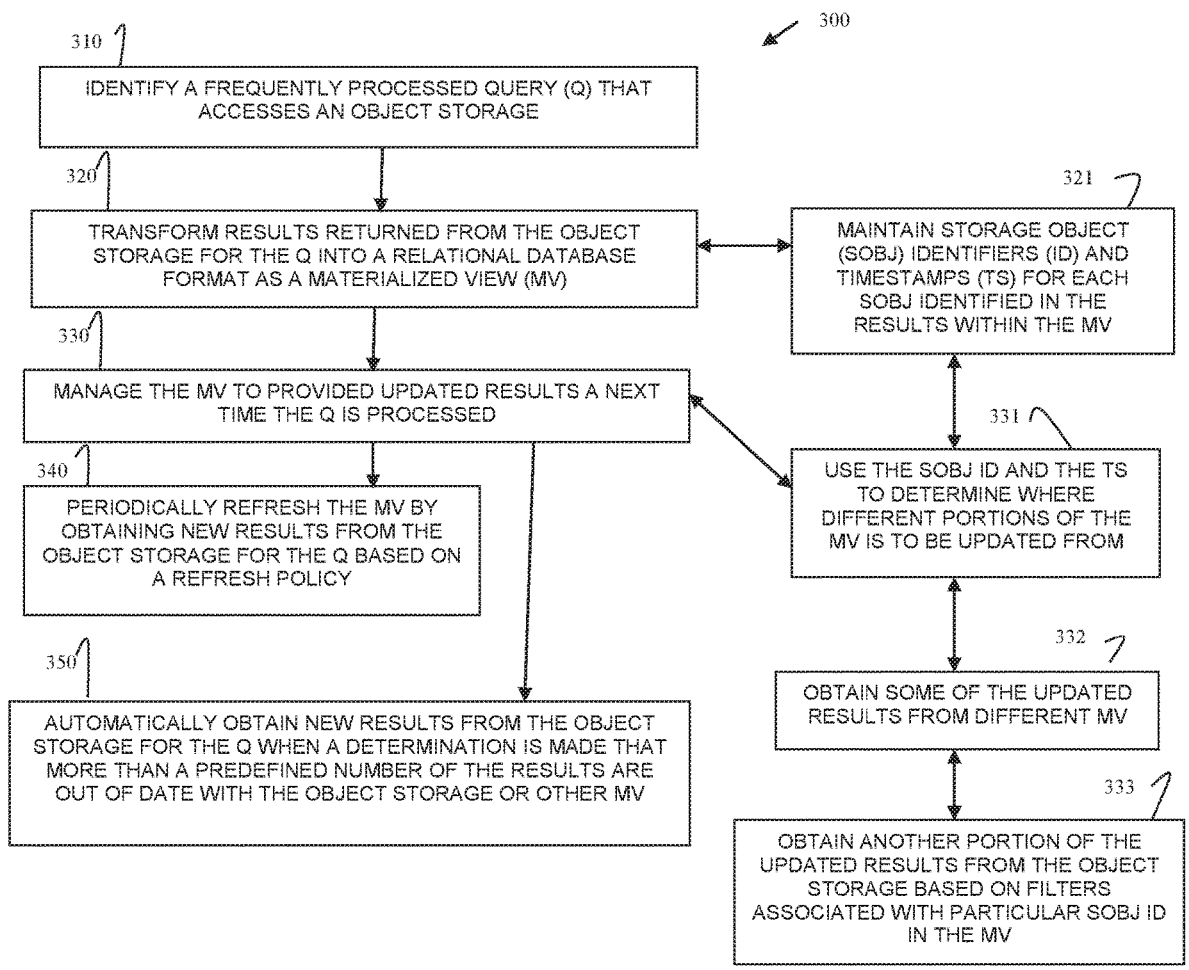
FIG. 3 is a diagram of another method for a point-in-time materialization of an object storage environment, according to an example embodiment.

FIG. 3 is a diagram of another method 300 for a point-in-time materialization of an object storage environment, according to an embodiment. The method 300 is implemented as one or more software modules referred to as a "storage object relational DBMS materialized view (MV) manager." The storage object relational DBMS MV manager represents executable instructions that are programmed within memory or a non-transitory computer-readable medium and executed by one or more hardware processors of a device. The storage object relational DBMS MV manager may have access to one or more network connections during processing, which can be wired, wireless, or a combination of wired and wireless.

The storage object relational DBMS MV manager presents another and in some ways enhanced perspective of the processing discussed above with the FIGS. 1 and 2.

In an embodiment, the storage object relational DBMS MV manager is all of or any combination of: the parser 102, the optimizer 103, the AMPs 104, the object mapper/tracker/updater 105, the object interface 106, the transformer 107, and/or the method 200.

At 310, the storage object relational DBMS MV manager identifies a frequently processed query that accesses an object storage.

At 320, the storage object relational DBMS MV manager transforms results returned from the object storage into a relational database format as a materialized view.

In an embodiment, at 321 the storage object relational DBMS MV manager maintains storage object identifiers and timestamps for each storage object identifier within the materialized view.

At 330, the storage object relational DBMS MV manager manages the materialized view to provide updated results a next time the query is processed.

In an embodiment of 321 and 330, at 331, the storage object relational DBMS MV manager uses the storage object identifiers and the timestamps to determine where different portions of the materialized view is to be updated from.

In an embodiment of 331 and at 332, the storage object relational DBMS MV manager obtains some of the updated results from different materialized views.

In an embodiment of 332 and at 333, the storage object relational DBMS MV manager obtains another portion of the updated results from the object storage based on filters associated with particular storage object identifiers in the materialized view.

In an embodiment, at 340, the storage object relational DBMS MV manager periodically refreshes the materialized view by obtaining new results from the object storage for the query based on a refresh policy.

In an embodiment, at 350, the storage object relational DBMS MV manager automatically obtains new results from the object storage when a determination is made that more than a predefined number of results are out of date with the object storage or other materialized views.

Figure 4:
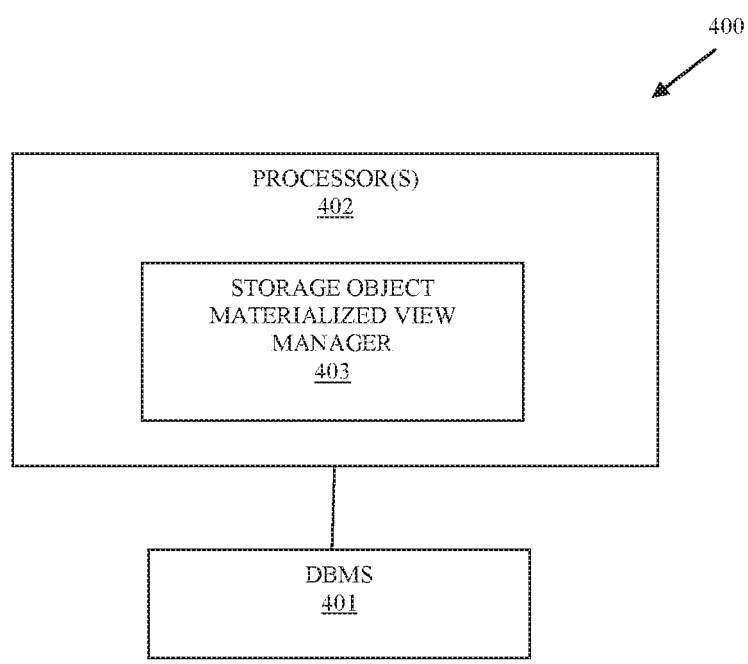
FIG. 4 is a diagram of a system for a point-in-time materialization of an object storage environment, according to an example embodiment.

FIG. 4 is a diagram of a system 400 for a point-in-time materialization of an object storage environment, according to an example embodiment. The system 400 includes a variety of hardware components and software components. The software components are programmed as executable instructions into memory and/or a non-transitory computer-readable medium for execution on the hardware components (hardware processors). The system 400 includes one or more network connections; the networks can be wired, wireless, or a combination of wired and wireless.

The system 400 implements, inter alia, the processing discussed above with the FIGS. 1-3.

The system 400 includes: a DBMS 401, at least one hardware processor 402 and a non-transitory computer-readable storage medium having executable instructions representing a storage object MV manager 403.

The storage object MV manager 403 when executed on the at least one hardware processor 402 from the non-transitory computer-readable storage medium performs processing to: i) identify a query that frequently processes against an object storage; ii) transform results returned from the object storage for the query into a relational format within a materialized view; and iii) manage updated results for the query when submitted a next time within the database management system 401 from the materialized view, different materialized views associated with other queries, and the object storage.

In an embodiment, the storage object MV manager 403 is further configured to perform processing to refresh the materialized view with new results obtained from the object storage.

In an embodiment, the storage object MV manager 403 manages the MV as a cache of the results for the query within the DBMS 401 and provides relational DBMS functionality available to processing against the results from the MV.

In an embodiment, the DBMS 401 is the components of the relational DBMS environment 110.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
processing a query submitted for an object storage, wherein the query is in a non-relational format;
transforming storage object values from storage objects in the object storage as results to the query, wherein the storage object values are transformed into a relational database format associated with tables, columns, and rows within a materialized view;

maintaining storage object identifiers and modification timestamps associated with the storage object values from the storage objects in the object storage and as column attributes within the materialized view for point-in-time consistent materialization for the object storage, wherein the object storage is accessed when the modification timestamps associated with the storage object values maintained as the column attributes within the materialized view are earlier than the modification timestamps associated with the storage object values in the object storage; and providing the materialized view to satisfy the query when submitted again without accessing the object storage.

2. The method of claim 1, wherein transforming further includes processing a Structured Query Language (SQL) SELECT Data Manipulation Language (DML) statement that defines a mapping between the storage object values to the relational database format.

3. The method of claim 1 wherein maintaining further includes, maintaining a filter representing text-formatted query conditions for the query with the materialized view.

4. The method of claim 3, wherein maintaining further includes periodically submitting the filter for the query to the object storage and updating the materialized view with new modification timestamps and new storage object values.

5. The method of claim 4, wherein updating further includes removing at least one storage object identifier and corresponding storage object values associated with the at least one storage object identifier.

6. The method of claim 4, wherein updating further includes adding at least one storage object identifier and corresponding storage object values associated with the at least one storage object identifier.

7. The method of claim 1, wherein providing further includes updating a portion of the storage object values with data values obtained from a different materialized view and a corresponding modification timestamp when a particular storage object identifier of the different materialized view matches a corresponding storage object identifier of the materialized view and has a more recent modification timestamp.

8. The method of claim 1, wherein providing further includes updating a portion of the storage object values from the object storage based on a filter associated with a particular storage object identifier included in the materialized view.

9. The method of claim 1, wherein providing further includes provide the materialized view to satisfy the query without accessing the object storage.

10. The method of claim 1, wherein providing further includes updating the materialized view to satisfy the query by obtaining:
first storage object values from different materialized views and second storage object values from the object store.

11. The method of claim 10 further comprising, periodically refreshing the materialized view from the object storage based on a refresh policy.

12. A method comprising:
identifying a query that accesses an object storage, wherein the query is in a non-relational format;
transforming storage object values from storage objects in the object storage, wherein the storage object values are transformed into a relational database format associated with tables, columns, and rows as a materialized view providing results for the query;
maintaining storage object identifiers and modification timestamps associated for each storage object and as column attributes within the materialized view for point-in-time consistent materialization for the object storage, wherein the object storage is accessed when the modification timestamps associated with the storage object values maintained as the column attributes within the materialized view are earlier than the modification timestamps associated with the storage object values in the object storage; and
managing the materialized view to provide updated results for the query a next time the query is processed.

13. The method of claim 12, wherein managing further includes using the storage object identifiers and the modification timestamps to determine where different portions of the materialized view are to be updated from.

14. The method of claim 13, wherein using further includes obtaining some of the updated results from different materialized views.

15. The method of claim 14, wherein obtaining further includes obtaining another portion of the updated results from the object storage based on filters associated with particular storage object identifiers in the materialized view.

16. The method of claim 12 further comprising, periodically refreshing the materialized view by obtaining new results from the object storage for the query based on a refresh policy.

17. The method of claim 12 further comprising, automatically obtaining new results from the object storage for the query when a determination is made that more than a predefined portion of the results are out of date with the object storage or other materialized views.

18. A system, comprising:
a database management system;
at least one hardware processor;
a non-transitory computer-readable storage medium having executable instructions representing a storage object materialized-view manager;
the storage object materialized-view manager configured to execute on the at least one hardware processor from the non-transitory computer-readable storage medium and to perform processing to:
i) identify a query that processes against an object storage, wherein the query is in a non-relational format;
ii) transform storage object values from storage objects in the object storage for the query, wherein the storage object values are transformed into a relational database format associated with tables, columns, and rows within a materialized view as results for the query;
iii) maintain storage object identifiers and modification timestamps associated with the storage object values from the storage objects in the object storage and as column attributes within the materialized view for point-in-time consistent materialization for the object storage, wherein the object storage is accessed when the modification timestamps associated with the storage object values maintained as the column attributes within the materialized view are earlier than the modification timestamps associated with the storage object values in the object storage; and
iv) manage updated results for the query when submitted a next time within the database management system from the materialized view, different materialized views associated with other queries, and the object storage.

19. The system of claim 18, wherein the storage object materialized-view manager is further configured to perform processing to:
   v) refresh the materialized view with new results obtained from the object storage.

* * * * *